United States Patent
Wu et al.

(10) Patent No.: US 10,850,353 B2
(45) Date of Patent: Dec. 1, 2020

(54) METHOD AND SYSTEM FOR ENABLING SYNCHRONOUS SHEET TRANSFER TO FOLLOW LASER CUTTING DYNAMICALLY

(71) Applicant: BAOSHAN IRON & STEEL CO., LTD., Shanghai (CN)

(72) Inventors: Ruimin Wu, Shanghai (CN); Saidan Yang, Shanghai (CN); Zhaodong Liang, Shanghai (CN); Ye Ding, Shanghai (CN)

(73) Assignee: Baoshan Iron & Steel Co., Ltd., Shanghai (CN)

( * ) Notice: Subject to any disclaimer, the term of this patent is extended or adjusted under 35 U.S.C. 154(b) by 436 days.

(21) Appl. No.: 15/754,544

(22) PCT Filed: Mar. 29, 2016

(86) PCT No.: PCT/CN2016/077625
§ 371 (c)(1),
(2) Date: Feb. 22, 2018

(87) PCT Pub. No.: WO2017/036127
PCT Pub. Date: Mar. 9, 2017

(65) Prior Publication Data
US 2018/0257176 A1    Sep. 13, 2018

(30) Foreign Application Priority Data
Aug. 31, 2015 (CN) .......................... 2015 1 0548227

(51) Int. Cl.
*B23K 26/38* (2014.01)
*B23K 26/16* (2006.01)
(Continued)

(52) U.S. Cl.
CPC .......... *B23K 26/38* (2013.01); *B23K 26/0846* (2013.01); *B23K 26/0853* (2013.01);
(Continued)

(58) Field of Classification Search
CPC .. B23K 26/38; B23K 26/702; B23K 26/0846; B23K 26/0853; B23K 26/16; B23K 37/0288; B23K 37/0408
(Continued)

(56) References Cited

U.S. PATENT DOCUMENTS

| 6,031,199 A | * | 2/2000 | Ream | B23K 26/26 219/121.63 |
| 2006/0118529 A1 | * | 6/2006 | Aoki | B23K 26/16 219/121.67 |

(Continued)

FOREIGN PATENT DOCUMENTS

| CN | 1919519 A | 2/2007 |
| CN | 104275553 A | 1/2015 |

(Continued)

*Primary Examiner* — Huyen D Le
(74) *Attorney, Agent, or Firm* — Thomas Horstemeyer, LLP

(57) ABSTRACT

The present invention provides a system for enabling synchronous sheet transfer to follow laser cutting dynamically. A laser-cutting method for the system for enabling synchronous sheet transfer to follow laser cutting dynamically is also provided. With the system and method of the present invention, dynamic following of sets of magnetic belts during the cutting procedure is implemented, thereby accelerating the processing pace, and further improving the throughput.

8 Claims, 4 Drawing Sheets

(51) Int. Cl.
*B23K 26/70* (2014.01)
*B23K 26/08* (2014.01)
*B23K 37/02* (2006.01)
*B23K 37/04* (2006.01)
*B23K 101/16* (2006.01)
*B23K 101/00* (2006.01)

(52) U.S. Cl.
CPC .......... *B23K 26/16* (2013.01); *B23K 26/702* (2015.10); *B23K 37/0288* (2013.01); *B23K 37/0408* (2013.01); *B23K 2101/006* (2018.08); *B23K 2101/16* (2018.08)

(58) Field of Classification Search
USPC ..................................................... 219/121.72
See application file for complete search history.

(56) References Cited

U.S. PATENT DOCUMENTS

| | | | | |
|---|---|---|---|---|
| 2010/0252538 | A1* | 10/2010 | Zeygerman | ........ B23K 37/0408 219/121.18 |
| 2010/0252542 | A1* | 10/2010 | Zeygerman | .......... B23K 10/003 219/121.67 |
| 2019/0111516 | A1* | 4/2019 | Meyer | .................... B23K 26/38 |

FOREIGN PATENT DOCUMENTS

| | | | |
|---|---|---|---|
| CN | 204094315 | A | 1/2015 |
| CN | 104400232 | A | 3/2015 |
| CN | 105081584 | A | 11/2015 |
| JP | 09141463 | A | 3/1997 |
| WO | 2004065055 | A | 8/2004 |

* cited by examiner

METHOD AND SYSTEM FOR ENABLING SYNCHRONOUS SHEET TRANSFER TO FOLLOW LASER CUTTING DYNAMICALLY

CROSS-REFERENCE TO RELATED APPLICATIONS

This application is a 371 U.S. National Phase of PCT International Application No. PCT/CN2016/077625, filed on Mar. 29, 2016, which claims benefit and priority to Chinese patent application No. 201510548227.4, filed on Aug. 31, 2015. Both of the above-referenced applications are incorporated by reference herein in their entirety.

TECHNICAL FIELD

The present invention relates to the field of strip steel processing, and in particular, to a method and system for enabling synchronous sheet transfer to follow laser cutting dynamically in the field of automobile manufacturing technologies.

BACKGROUND

Material-cutting processing based on laser technologies has become a mature, commercially available technique, and numerical control laser processing systems are widely applied to rectangular metallic plates. With the flourishing development of laser technologies, the methods for plate processing can be applied with a higher speed and more flexibility. However, higher demands are proposed on automatic feeding and discharging as well as high-paced continuous production. Moreover, decoiling laser-cutting processing of coiled materials is under research and gradual application, for example, a conveyor system for laser-cutting processing of coiled materials is disclosed in Chinese patent CN 102281986A. In that system, two series of conveyors and a plurality of parallel supporting conveyors comprised are used to support strip profiles, and at the same time a laser head moving back and forth along a longitudinal axis of a crossbeam member processes the coil so as to obtain finished sheets. The supporting conveyors can make space for the cutting path, allowing the laser head to cut through the raw materials for acquiring a cut profile. This significantly remedies and solves the problems of the inability to cut the coils, and the fallen scraps resulting from the needle-like cutting plate making space for a cutting path, and has become a novel method for sheet processing in place of mould blanking for coils. The method avoids the requirement of the stamping tonnage for a high-strength material and reduces the high mould design and maintenance costs. In addition, the method based on laser cutting of coils also contributes greatly to the increase in the material utilisation rate.

In the published patent, the supporting conveyors that are basically in parallel and separated from each other are used and the adjustment of the supporting conveyors in different modes is implemented to adapt to processing requirements of different profiles, so as to implement support and make space for the cutting path to achieve profile processing. There are various processing modes as follows. In a "static single-feed and multiple-feed mode", the supporting conveyors move to stationary positions before a feed forming part. In a "dynamic single-feed mode", the supporting conveyors move to set positions in advance. In a "dynamic multiple-feed mode", the positions of the supporting conveyors may further change during a laser procedure, and at least one supporting conveyor may be stretched or retracted. In a "static continuous-feed mode", the supporting conveyors stay at stationary positions and the raw materials are continuously fed. In a "dynamic continuous-feed mode", for the supporting conveyors, during a laser-cutting procedure, at least one supporting conveyor may be stretched or retracted.

However, a common characteristic of these modes is that the supporting conveyors may be stationary or stretched or retracted during a cutting procedure according to profile requirements. During the cutting procedure, a supporting conveyor belt is at a fixed stationary position, and therefore a disadvantage of this operation manner is that it is difficult to ensure stable shutoff of a cutting process, and it is not easy to implement automatic sorting out of scraps of irregular shapes, resulting in reduced production efficiency.

SUMMARY OF THE INVENTION

The objective of the present invention is to provide a method and system for enabling synchronous sheet transfer to follow laser cutting dynamically, which can realize dynamic following of sets of magnetic belts and stable support and automatic sorting out of scraps during the cutting procedure, thereby accelerating the processing pace, and further improving the throughput by means of synchronous sheet transfer following multiple laser heads dynamically.

In order to achieve the above-mentioned object, the technical solution of the present invention is:

A system for enabling synchronous sheet transfer to follow laser cutting dynamically comprises: one or more processing stations; synchronous sheet transfer units, using sets of magnetic belts, and arranged respectively on a feeding side and a discharging side of the processing station, with each magnetic belt of the sets being able to be stretched and retracted and the gap between the magnetic belts being adjustable; a laser-cutting unit, provided at the processing station, and comprising at least one laser cutter and a laser-cutting head on the at least one laser cutter; a transfer and stacking unit, comprising a stacking platform and a stacking robot, the stacking platform being provided on an outer side of the set of magnetic belts of the synchronous sheet transfer unit on the discharging side of the processing station; a scrap conveyor belt device, arranged on one side of the processing station that is perpendicular to a feeding direction; a dust treating device and a real-time measurement device for the cutting of strip steel, which are provided at each processing station; a sheet position detecting device before stacking of the sheets, the device being arranged at a transfer station at the position of the set of magnetic belts on the discharging side outside the processing station; and a cutting control system, which is respectively connected to the synchronous sheet transfer units, the laser-cutting unit, the transfer and stacking unit, the scrap conveyor belt device, the dust treating device, the real-time measurement device, and the sheet position detecting device, so that the units and devices communicate with each other to establish an associative operation control and the stretching and retraction of the magnetic belts of the synchronous sheet transfer units follow the laser-cutting head.

Further, the sets of magnetic belts of the synchronous sheet transfer units comprise: conveyor motors for respectively controlling the sets of magnetic belts on the feeding side and the discharging side, and a control module for the conveyor motors; and a plurality of magnetic belts, each comprising: at least one independently controllable electromagnetic module; a stretching and retraction motor for controlling the stretching and retraction of each magnetic belt, and a control module for the stretching and retraction motor; and a width motor for controlling the gap between the magnetic belts, and a control module for the width motor.

Further, the real-time measurement device for the cutting of strip steel comprises: two cameras for measuring coordinates of a workpiece; and two cameras for visual detection and identification of separation after cutting and visual detection and identification of falling scraps.

In addition, the sheet position detecting device before stacking of the sheets comprises a camera, mounted above the transfer station, and for detecting the position of the sheets in the transfer station.

A laser-cutting method for the system for enabling synchronous sheet transfer to follow laser cutting dynamically of the present invention comprises the following steps:

a) the magnetic belts on the feeding side are pre-adjusted to an arrangement having fixed gaps therebetween and fixed stretching/retraction positions according to the width of strip steel and a cut profile so as to form a feeding start location for the set of magnetic belts on the feeding side, and at the same time the magnetic belts on the discharging side are pre-adjusted to an arrangement having fixed gaps therebetween and fixed stretching/retraction positions according to the width of the strip steel and the cut profile so as to form a discharging start location for the set of magnetic belts on the discharging side, and the magnetic belts take the strip steel to the processing station for laser cutting;

b) the profile of the strip steel entering a laser-cutting area of the processing station is measured by the real-time measurement device for positioning, so as to correct coordinates of the origin and the angle of a workpiece coordinate system in the laser-cutting control system before the cutting operation, and when the measurement is complete, the laser-cutting unit cuts the strip steel in a planned path according to a profile to be processed;

during the cutting procedure, the magnetic belts on the feeding side and the discharging side are adjusted synchronously and dynamically according to the cutting path, and the stretching/retraction adjustment amount is determined by the profile to be cut out, wherein the synchronous dynamic adjustment is effected by the cutting control system sending a signal to the control module for the stretching and retraction of the magnetic belts, and during the adjustment, the magnetic belts need to make space for a slit cut during the cutting procedure, so as to prevent the laser from penetrating the strip steel and making contact with any of the magnetic belts; and the magnetic belts on the feeding side and the discharging side at the position corresponding to a cut profile can be stretched or retracted for stabilising and supporting the sheets being processed while fulfilling the needs of material discharging and receiving on the discharging side;

during the cutting procedure, as regards the scraps formed, a signal is generated in the cutting control system and transmitted to the real-time measurement device for detecting and identifying the falling of the scraps in real time; when the cutting procedure is complete, the cutting control system sends a signal for carrying out a detection of all the cut profiles by the real-time measurement device for the cutting of the strip steel, so as to determine the separation of the processed sheets and the strip steel;

c) when the sheets are processed, the set of magnetic belts on the feeding side is at a feeding end location and the set of magnetic belts on the discharging side is at a discharging end location; the processed sheets enter an outputting state at the discharging end location on the set of magnetic belts on the discharging side and is output to the transfer station, and at the same time, the sets of magnetic belts on the feeding side and the discharging side are stretched or retracted back to the start locations again, strip steel moves onwards by one step for processing in a next cycle; and d) before transferring the sheets, the camera of the sheet position detecting device detects the position of the sheets, the position of the sheets is fed back to the transfer and stacking robot for correcting its posture, and then the tooling at the end of the transfer and stacking robot sticks to and picks up the processed sheets by suction and stacks same at a stacking station.

Further, during the cutting procedure, the magnetic belts on the feeding side and the discharging side can be adjusted synchronously and dynamically according to the cutting path, wherein for the cutting path formed by the cutting profile, a corresponding signal for the stretching/retraction operation of the magnetic belts to be adjusted is programmed according to cutting feature information, such that the stretching/retraction of the magnetic belts is adjusted under the control of the cutting system; and each magnetic belt in the sets of magnetic belts can be dynamically adjusted to stretch and retract, and during the adjustment of the magnetic belt, the cutting head carries out the cutting in the cutting path synchronously.

Preferably, two or more laser processing stations are arranged and two or more sets of magnetic belts are arranged for corresponding synchronous sheet transfer units, and each processing station has one or more laser cutters; during the cutting procedure, the sets of magnetic belts on the feeding side and the discharging side corresponding to the cutting head on the laser cutter of each processing station are adjusted synchronously and dynamically, so as to perform regional stepped cutting on a sheet to be processed in two cutting ranges, a part of the sheet to be processed is cut in a first processing station, another part of the sheet to be processed is cut in a second processing station, the laser-cutting heads in the two processing stations operate in coordination with a first set of magnetic belts and a second set of magnetic belts respectively, that is, when the laser-cutting heads of the two processing stations respectively operate in a cutting movement procedure, the two sets of magnetic belts are respectively stretched and retracted synchronously and dynamically, each time one set of operations is complete in the two cutting areas, the strip steel moves onwards by one step, the cutting heads of the two processing stations operate in coordination with the two sets of magnetic belts again, and this cycle is repeated; and the laser-cutting head on the laser cutter of the second processing station makes the final cut and obtains an eventual processed sheet and conveys the processed sheet to a second set of magnetic belts on the discharging side for output.

Preferably, the magnetism of the sets of magnetic belts on the feeding side and the discharging side is activated or deactivated by the control of the electromagnetic module, wherein the electromagnetic module in the laser-cutting area is fully or partially magnetised when the sets of magnetic belts are stationary, and the electromagnetic module is fully demagnetised in the dynamic process of stretching or retraction of the sets of the magnetic belts; and for the cutting path formed by the cutting profile, a magnetic signal for the electromagnetic module for the magnetic belts, which corresponds to magnetic feature information, is programmed so as to achieve the control of the magnetism of the electromagnetic module under the control of the cutting control system.

Coiled materials are decoiled by a decoiling and clamping unit to form strip steel, and the strip steel is conveyed to the set of magnetic belts on the feeding side. The set of magnetic belts on the feeding side takes the strip steel to the processing station for laser cutting. The magnetic belts on the feeding side can be pre-adjusted to an arrangement with fixed gaps therebetween and in a fixed stretching/retraction position according to the width of strip steel and a cutting profile so as to form a feeding start location for the set of magnetic belts on the feeding side, and at the same time the magnetic belts on the discharging side are pre-adjusted to an arrangement having fixed gaps therebetween and fixed stretching/retraction positions according to the width of the strip steel and the cut profile so as to form a discharging start location for the set of magnetic belts on the discharging side. The position of the strip steel entering the laser-cutting area is measured by the workpiece coordinate measurement system, so as to correct the coordinates of the origin and the angle of a workpiece coordinate system in the control system before the cutting operation, and when the measurement is complete, the laser-cutting unit cuts the strip steel in a planned path according to a profile to be produced. During the cutting procedure, the magnetic belts on the feeding side and the discharging side are adjusted synchronously and dynamically according to the cutting path, wherein the adjustment is determined according to the cutting profile and during the adjustment, the magnetic belts need to make space for a slit cut during the cutting procedure, in order to prevent the laser from penetrating the strip steel and making contact with any of the magnetic belts; and the magnetic belts on the feeding side and the discharging side at the position corresponding to a cut profile can be stretched or retracted for stabilising and supporting the sheets being processed while fulfilling the needs of material discharging and receiving on the discharging side. During the cutting procedure, as regards the scraps formed, a signal is generated in the cutting control system and transmitted to the system for visual detection and identification of falling scraps, so as to achieve detection of the falling scraps in real time. When the cutting procedure is complete, the cutting control system sends a corresponding signal for carrying out a detection of all the cut profiles by the visual system for cutting and separation, so as to determine the separation of the processed sheets and the strip steel. After the sheets are processed, the set of magnetic belts on the feeding side is at a feeding end location and the set of magnetic belts on the discharging side is at a discharging end location. The processed sheets enter an outputting state at the discharging end location on the set of magnetic belts on the discharging side and is output to the transfer station. Before transferring the sheets, the sheet position detecting device detects the position of the sheets, the position of the sheets is fed back to the transfer and stacking robot for correcting its posture, and then the tooling at the end of the transfer and stacking robot sticks to and picks up the processed sheets by suction and stacks same at a stacking station.

During the cutting procedure, the magnetic belts on the feeding side and the discharging side can be adjusted synchronously and dynamically according to the cutting path in the following specific manner for the cutting path formed by the cutting profile, cutting feature information is extracted therefrom so as to output a corresponding signal from the cutting control system, i.e. the stretching/retraction operation of a magnetic belt to be adjusted is programmed according to the cutting feature information, and the adjustment of the magnetic belt is effected by the communication of the numerical control and the magnetic belt shaft control; and each magnetic belt in the sets of magnetic belts can be dynamically adjusted to stretch and retract, and during the adjustment of the magnetic belt, the numerical control unit carries out the cutting in the cutting path synchronously.

Further, the specific procedure of the synchronous dynamic adjustment is as follows: the strip steel is held stationary after being moved to the cutting area, and at this moment, the set of magnetic belts on the feeding side is at the feeding start location and the set of magnetic belts on the discharging side is at the discharging start location. According to the actions of the magnetic belts for the adjustment corresponding to the generated feature information in operation, when the cutting procedure proceeds to the feature information in the cutting control system, the corresponding magnetic belt begins to stretch or retract to a designed position, which is considered to be the dynamic adjustment stage for the sets of magnetic belts on the feeding side and the discharging side. The magnetic belts are adjusted dynamically to positions in which they do not interfere with laser beams according to the laser-cutting profile, while the cutting action proceeds normally until the cutting is finished. The sets of magnetic belts on the feeding side and the discharging side are then adjusted to the end locations. The processed sheet obtained is output by the set of magnetic belts on the discharging side, and at the same time the sets of magnetic belts on the feeding side and on the discharging side are stretched or retraction again back to the start locations, strip steel moves onwards by one step for processing in a next cycle. A laser tool setting process needs to be designed for a slit between cutting positions before and after the strip steel moves onwards by one step to implement a final cut.

When there is one laser-cutting head, the sets of magnetic belts are a paired combination, that is, the set of magnetic belts on the feeding side and the set of magnetic belts on the discharging side, and one transfer and stacking robot is configured. The present invention is not limited to such setting. One or more laser-cutting heads may be flexibly arranged, two or more sets of magnetic belts may be flexibly arranged in pairs, and two or more transfer and stacking robots are introduced according to requirements. The number of steps by which the strip steel moves onwards in a cutting area is not limited in the present invention either, and processed sheets may be obtained by using one or more stepper devices.

The advantages of the present invention lie in:

the method and system for enabling synchronous sheet transfer to follow laser cutting dynamically of the present invention resolve the issue of online automatic falling of scraps during processing using a common numerical control laser system, and at the same time realize a critical sheet transfer function and a function of synchronous and dynamic adjustment in a method for processing coiled materials; the function of synchronously and dynamically adjusting magnetic belts during the cutting procedure is used to realize functions such as sheet supporting, material carrying, automatic sorting out of scraps, and passing through of laser; and magnetic belts are synchronously adjusted during a laser-cutting procedure and the objective of sheet transfer is achieved, thereby effectively improving the operation efficiency.

DETAILED DESCRIPTION OF THE EMBODIMENTS

Figure 1:
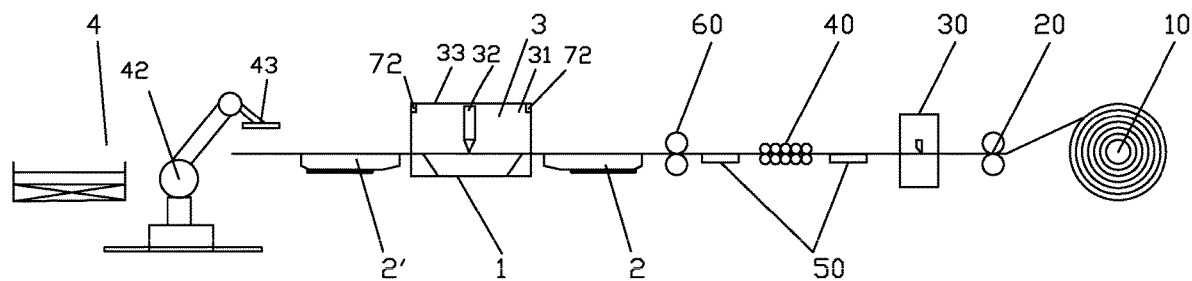
FIG. 1 is a schematic diagram of an embodiment of the present invention.
Figure 2:
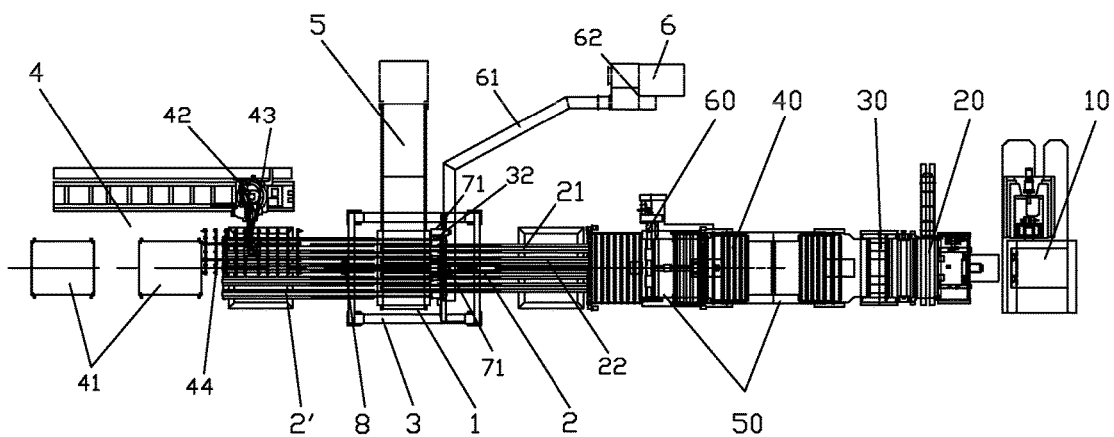
FIG. 2 is a planar layout diagram of an embodiment of the present invention.

Referring to FIG. 1 and FIG. 2, a system for enabling synchronous sheet transfer to follow laser cutting dynamically of the present invention comprises: a processing station 1; synchronous sheet transfer units 2 and 2', using sets of magnetic belts, and arranged respectively on a feeding side and a discharging side of the processing station 1, with each magnetic belt C11, C12, C13, C14, C21, C22, C23, C24 and C25 of the sets being able to be stretched and retracted and the gap between magnetic belts being adjustable;

a laser-cutting unit 3, provided at the processing station 1, and comprising at least one laser cutter 31 and a laser-cutting head 32 on the at least one laser cutter;

a transfer and stacking unit 4, comprising a stacking platform 41 and a transfer and stacking robot 42 (a tooling 43 and vacuum suction cups 44 of the tooling), the stacking platform 41 being provided on an outer side of the set of magnetic belts of the synchronous sheet transfer unit 2' on the discharging side of the processing station 1;

a scrap conveyor belt device 5, arranged on one side of the processing station 1 perpendicular to a feeding direction;

a dust treating device 6 and a real-time measurement device 7 for the cutting of strip steel, which are provided at each processing station 1;

a sheet position detecting device 8 before stacking of the sheets, the device being arranged at a transfer station at the position of the set of magnetic belts on the discharging side outside the processing station 1; and a cutting control system (not shown), which is respectively connected to the synchronous sheet transfer units 2 and 2', the laser-cutting unit 3, the transfer and stacking unit 4, the scrap conveyor belt device 5, the dust treating device 6, the real-time measurement device 7, and the sheet position detecting device 8, so that the units and devices establish an associative operation control and the stretching or retraction of the magnetic belts of the synchronous sheet transfer units follow the laser cutting.

In this embodiment, a dust adsorption area of the dust treating device 6 is correspondingly below the processing station 1, and dust is recycled into a dust recycle device 62 through a flue 61.

The real-time measurement device 7 for measuring strip steel is provided at the processing station 1. Two cameras 71 for measuring the coordinates of a workpiece are mounted on the laser cutter 31, wherein one of the cameras is mounted on an X-Y platform of the cutter and the other is mounted on the Z-axis of the cutter for enhanced detection accuracy. Two cameras 72 for visual detection and identification of separation after cutting and visual detection and identification of falling scraps are mounted on an enclosure 33 of the isolated processing station 1.

A position detecting device 8 before a stack of sheets is arranged at a transfer station at the position of the set of magnetic belts on the discharging side on the outer side of the processing station, i.e. on the outer side of the enclosure 33 outside the processing station 1 in this embodiment. The visual range of the camera 8 is mounted at an inclined angle so as to be able to cover a sheet output area.

FIG. 2 is a planar layout diagram of a method disclosed in the present invention. The laser cutter takes the form of a robot in right-angle coordinates which can move in X, Y and Z directions, having a working travel of 2000 mm in length (X-axis)×2000 mm in width (Y-axis)×200 mm in thickness (Z-axis). The length of the set of magnetic belts on the feeding side and the length of the set of magnetic belts on the discharging side are respectively 4500 mm. Two stacking platforms for stacking sheets are provided, on which processed sheets may be stacked or large-size scraps may be stacked according to requirements.

Coiled materials are decoiled by using a decoiler 10 and are laterally guided and then enter a feeding and clamping roller 20. A decoiling head shear 30 cuts the head of a coiled material to enable the coiled material to enter a leveller 40 to further straighten the sheet form. The coiled material subsequently passes through a transitional platform 50 to reach a feeder 60 to take the flat strip steel into the set of magnetic belts of the synchronous sheet transfer unit 2 on the feeding side of the processing station 1. The set of magnetic belts on the feeding side comprises four magnetic belts: C11, C12, C13 and C14, and the set of magnetic belts of the synchronous sheet transfer unit 2' on the discharging side comprises five magnetic belts: C21, C22, C23, C24 and C25.

The magnetic belts on the feeding side can be preadjusted to an arrangement having fixed gaps therebetween and fixed stretching/retraction positions according to the width of strip steel and a cut profile so as to form a feeding start location for the set of magnetic belts on the feeding side, and at the same time the magnetic belts on the discharging side are pre-adjusted to an arrangement having fixed gaps therebetween and fixed stretching/retraction positions according to the width of the strip steel and the cut profile so as to form a discharging start location for the set of magnetic belts on the discharging side.

The profile of the strip steel entering the laser-cutting area of the processing station 1 is collected, analysed and processed by using a CCD camera, so that the position of origin and angle of the workpiece coordinate system in the control system can be corrected before cutting.

After the measurement is complete, the laser-cutting head 32 on the laser cutter 31 of the laser-cutting unit 3 cuts the strip steel in a planned path according to a profile to be produced. The laser cutter 31 enables the laser-cutting head 32 to move in three directions X, Y, and Z to complete cutting motions. During the cutting procedure, the laser-cutting head 32 keeps a cutting movement state, and at the same time, the magnetic belts of the synchronous sheet transfer units 2 and 2' on the feeding side and the discharging side may be adjusted, that is, synchronously and dynamically stretched or retracted according to a requirement of the cutting path. The adjustment depends on the shape of cutting, and the effect of adjustment is to make space for a slit during the cutting procedure, in order to prevent the laser from penetrating the strip steel and making contact with the magnetic belts. In addition, the magnetic belts are adjusted, that is, synchronously and dynamically stretched or retracted, so that sheets of which path cutting is complete are supported. The adjusted magnetic belts are in a fully or partially magnetised stationary state, so as to provide stable contact to processed sheets. The stretched or retracted magnetic belts are in a fully demagnetised moving state.

After the sheets are processed, the set of magnetic belts of the synchronous sheet transfer unit 2 on the feeding side is at a feeding end location and the set of magnetic belts of the synchronous sheet transfer unit 2' on the discharging side is at a discharging end location. The processed sheets are at the discharging end location on the set of magnetic belts on the discharging side. The magnetic belts are demagnetised, and the processed sheets enter an outputting state at the magnetic belts and return and are output to the transfer station through the belt. A tooling 421 on the transfer and stacking robot 42 of the transfer and stacking unit 4 sticks to and picks up the processed sheets by suction via using adjusted and combined vacuum suction cups 44 and stacks the processed sheets on the stacking platform 41. The accurate position for picking up the sheets can be detected by the CCD camera at an output end and fed back, such that the transfer and stacking robot 42 corrects its transfer posture and it is thereby ensured that the position deviation of the stack of sheets is within a required precision range. At the same time when the processed sheets are discharged, the sets of magnetic belts are stretched or retracted back to the feeding start locations or discharging start locations. At the same time, the strip steel moves onwards by one step to enter a next cycle for cutting.

The vacuum suction cups 44 are pre-adjusted to positions that meet the suction shapes of the processed sheets, and the arranged vacuum suction cups 44 can be controlled to be turned on or off.

Figure 3:
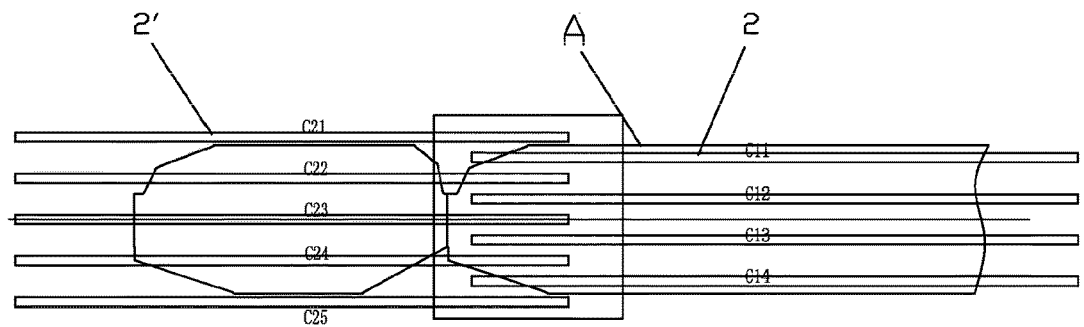
FIGS. 3 to 6 are process diagrams of sets of magnetic belts of synchronous sheet transfer following a slit dynamically according to the present invention.

Specifically, during the cutting procedure, the magnetic belts C11, C12, C13 and C14 of the set of magnetic belts of the synchronous sheet transfer unit 2 on the feeding side and the magnetic belts C21, C22, C23, C24 and C25 of the set of magnetic belts the synchronous sheet transfer unit 2' on the discharging side are firstly located at the feeding start location and discharging start location respectively, as shown in FIG. 3.

Figure 4:
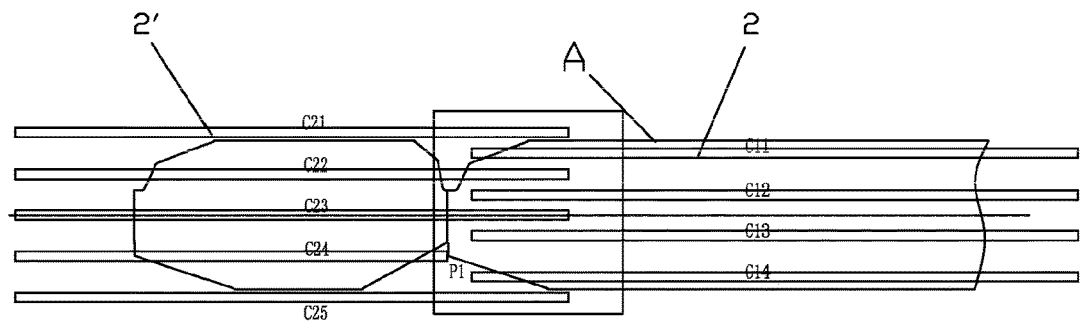
Figure 5:
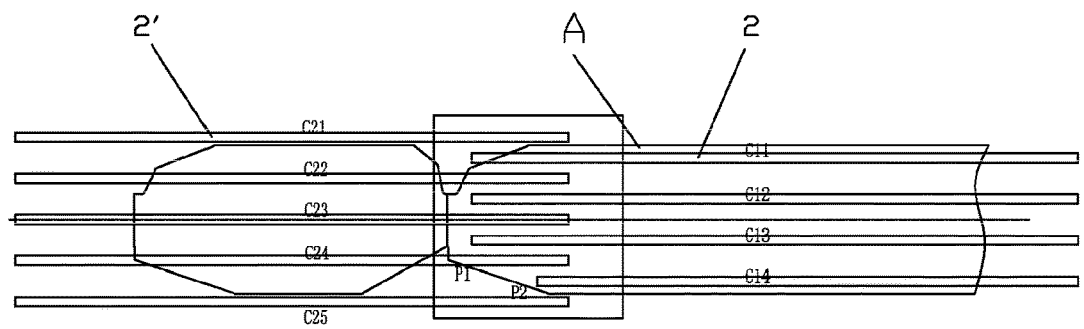

When cutting the path P1, the magnetic belt C24 on the discharging side has been retracted according to the feature point signal N1 formed of cutting feature information to make space for the cutting path P1, as shown in FIG. 4. When cutting along the cutting path P1, the magnetic belt C14 on the feeding side has been retracted according to the feature point signal N2 to make space for the cutting path P2, while the magnetic belt C24 on the discharging side has been stretched according to the feature point signal N2 to carry the part of the processed sheet, as shown in FIG. 5. The cutting paths such as P1 and P2 are only defined to illustrate the stretching and retraction of the magnetic belts, and one cutting line may consist of a plurality of paths. C24 and C14 are demagnetised during stretching and retraction, and other magnetic belts are partially or fully magnetised. C24 and C14 are partially or fully magnetised after movement is complete.

Figure 6:
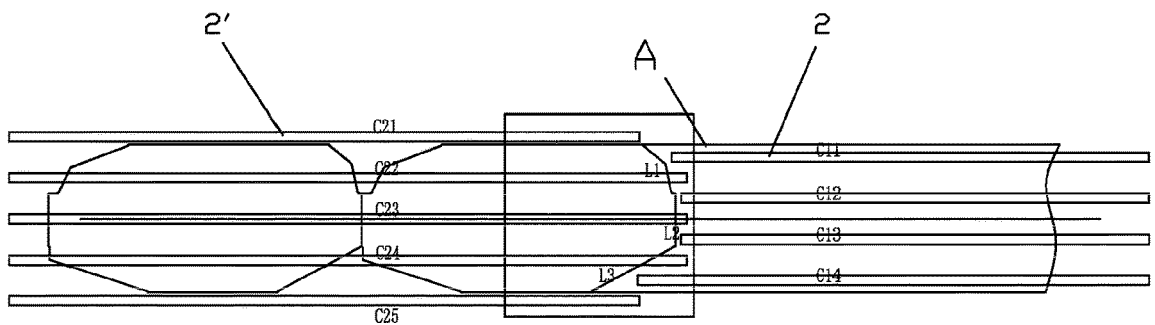

For the size of an object in this embodiment, the strip steel needs to move onwards by one step again. After the strip steel moves onwards by one step, the CCD camera detects the position of the strip steel in the cutting area again, and the position is corrected by using the control system. Subsequently, the magnetic belts on the feeding side and the magnetic belts on the discharging side are stretched and retracted again according to new feature point signals during the cutting procedure to implement cutting of L1 to L3, to eventually complete cutting processing of a processed sheet A. After the sheet A is processed, the magnetic belts on the feeding side and the discharging side are respectively located at a feeding end location and a discharging end location, as shown in FIG. 6. The strip steel moves onwards by one step again to enter the cyclic operation of a new processed sheet. The magnetic belts which are moving are demagnetised, while the magnetic belts which are stationary can be partially or fully magnetised according to processing requirements of sheets. Each magnetic belt is provided with an electromagnetic module and can be controlled individually.

Figure 7:
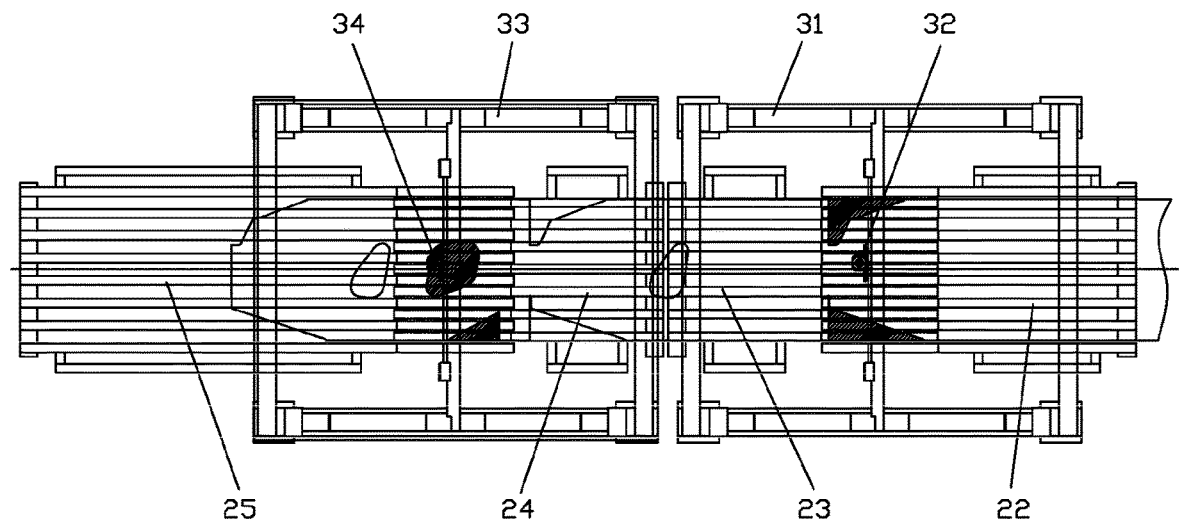
FIG. 7 is a schematic diagram of magnetic belts following cutting of two laser heads synchronously and dynamically.
Figure 8:
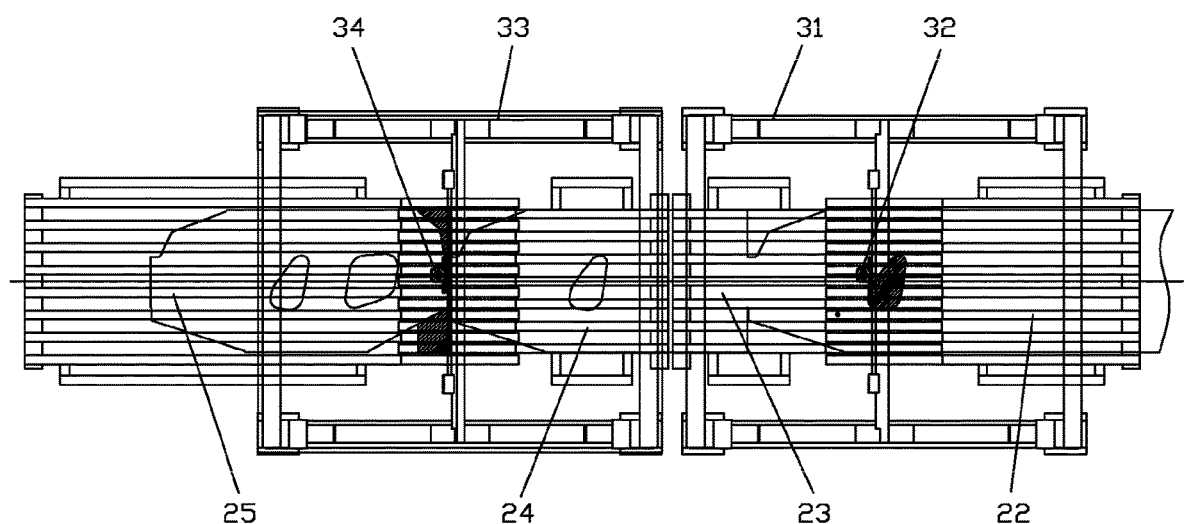
FIG. 8 is a schematic diagram of implementing a process of controlling dynamic following of synchronous sheet transfer according to the present invention.

Referring to FIG. 7 and FIG. 8, to satisfy a processing requirement, two or more laser cutters and corresponding two or more sets of magnetic belts may be arranged. During the cutting procedure, the sets of magnetic belts on the feeding side and the discharging side corresponding to the cutting head of each laser cutter are adjusted synchronously and dynamically, to perform regional step cutting on a processed sheet in two cutting ranges.

A first laser cutter 31 and a laser-cutting head 32 thereof cut a part of a processed sheet, and a second laser cutter 33 and a laser-cutting head 34 thereof cut another part of the processed sheet. The two laser-cutting heads 32 and 34 operate in coordination with a first set 22 and 23 of magnetic belts and a second set 24 and 25 of magnetic belts respectively. That is, during respective cutting movement procedures of the two laser-cutting heads 32 and 34, the two sets of magnetic belts are respectively stretched and retracted synchronously and dynamically. FIG. 7 is a schematic layout diagram of stepwise cutting of processed sheets in two cutting areas with the two sets of magnetic belts. Each time one set of operations is complete in the two cutting areas, the strip steel moves onwards by one step. As shown in FIG. 8, the two laser-cutting heads 32 and 34 operate in coordination with the two sets of magnetic belts again, and this cycle is repeated. The laser-cutting head 34 on the second laser cutter 33 makes a final cut and obtains an eventual processed sheet on the second set 25 of magnetic belts on the discharging side for output.

Figure 9:
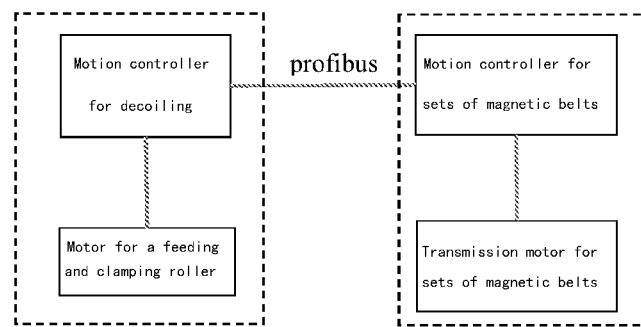
FIG. 9 is a schematic diagram of synchronous control of a decoiling unit and sets of magnetic belts according to the present invention.

Referring to FIG. 9, to implement a method for enabling synchronous sheet transfer to follow laser cutting dynamically, in a method for implementing the control system, the transfer speed of the decoiling and clamping unit is kept consistent with the transfer speeds of the sets of magnetic belts on the feeding side and the discharging side by means of PROFIBUS communication to implement synchronous control. This method effectively ensures the implementation of synchronous sheet transfer.

Figure 10:
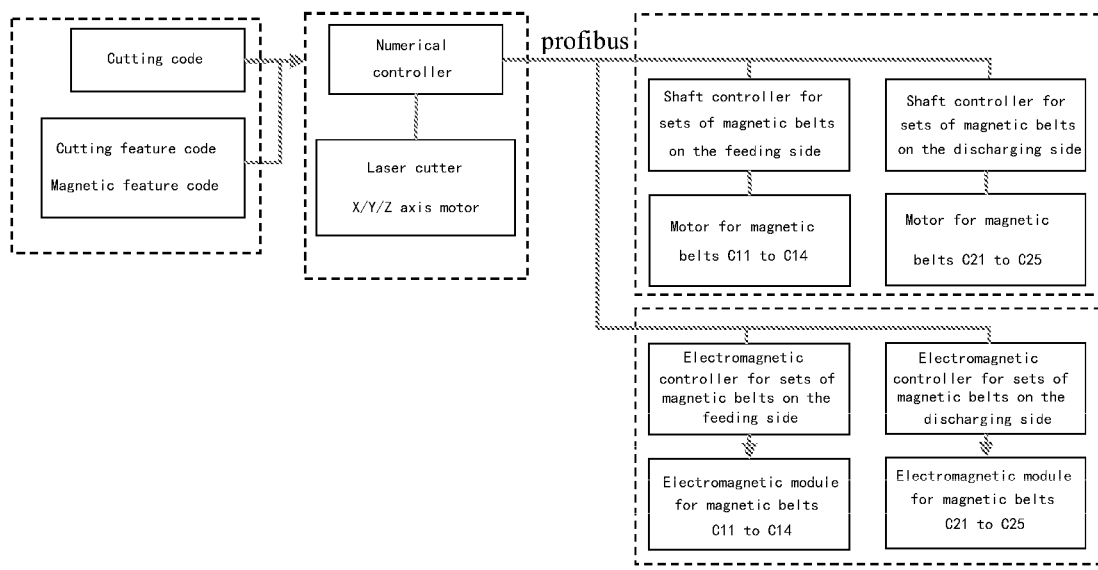
FIG. 10 is a schematic diagram of dynamic control of a numerically controlled laser cutter and shafts of sets of magnetic belts according to the present invention.

Referring to FIG. 10, a cooperative control of the laser cutter and the sets of magnetic belts on the feeding side and the discharging side is implemented by means of PROFIBUS communication between the numerical control system, a magnetic belt shaft control system, and the electromagnetic control system for the magnetic belts. This method effectively ensures that the sets of magnetic belts follow a laser-cutting procedure dynamically and effectively and controls the magnetisation and demagnetisation of electromagnetic modules by means of electromagnetic control modules, such that the numerical control system can make the rule about the cutting path, the cutting feature signals and the magnetic feature signals beforehand.

The invention claimed is:

1. A system for enabling synchronous sheet transfer to follow laser cutting dynamically, characterized by comprising:

one or more processing stations;

synchronous sheet transfer units, using sets of magnetic belts, and arranged respectively on a feeding side and a discharging side of the processing station, with each magnetic belt of the sets being able to be stretched and retracted and the gap between the magnetic belts being adjustable;

a laser-cutting unit, provided at the processing station, and comprising at least one laser cutter and a laser-cutting head on the at least one laser cutter;

a transfer and stacking unit, comprising a stacking platform and a stacking robot, the stacking platform being provided on an outer side of a set of magnetic belts of a synchronous sheet transfer unit on the discharging side of the processing station;

a scrap conveyor belt device, arranged on one side of the processing station that is perpendicular to a feeding direction;

a dust treating device and a real-time measurement device for the cutting of strip steel, which are provided at each processing station;

a sheet position detecting device before stacking of the sheets, the device being arranged at a transfer station at the position of the set of magnetic belts on the discharging side outside the processing station; and a cutting control system, which is respectively connected to the synchronous sheet transfer units, the laser-cutting unit, the transfer and stacking unit, the scrap conveyor belt device, the dust treating device, the real-time measurement device, and the sheet position detecting device, so that the units and devices communicate with each other to establish an associative operation control and the stretching and retraction of the magnetic belts of the synchronous sheet transfer units follow the laser-cutting head.

2. The system for enabling synchronous sheet transfer to follow laser cutting dynamically according to claim 1, characterized in that, the sets of magnetic belts of the synchronous sheet transfer units comprise:

conveyor motors for respectively controlling the sets of magnetic belts on the feeding side and the discharging side, and a control module for the conveyor motors; and a plurality of magnetic belts, each comprising:
  at least one independently controllable electromagnetic module;
  a stretching and retraction motor for controlling the stretching and retraction of each magnetic belt, and a control module for the stretching and retraction motor; and
  a width motor for controlling the gap between the magnetic belts, and a control module for the width motor.

3. The system for enabling synchronous sheet transfer to follow laser cutting dynamically according to claim 1, characterized in that, the real-time measurement device for the cutting of strip steel comprises:

two cameras for measuring coordinates of a workpiece; and two cameras for visual detection and identification of falling scraps and visual detection and identification of separation after cutting.

4. The system for enabling synchronous sheet transfer to follow laser cutting dynamically according to claim 1, characterized in that, the sheet position detecting device before stacking of the sheets comprises a camera, mounted above the transfer station, and for detecting the position of the sheets in the transfer station.

5. A laser-cutting method for a system for enabling synchronous sheet transfer to follow laser cutting dynamically according to claim 1, characterized in that:

a) the magnetic belts on the feeding side are pre-adjusted to an arrangement having fixed gaps therebetween and fixed stretching/retraction positions according to the width of strip steel and a cut profile so as to form a feeding start location for the set of magnetic belts on the feeding side, and at the same time the magnetic belts on the discharging side are pre-adjusted to an arrangement having fixed gaps therebetween and fixed stretching/retraction positions according to the width of the strip steel and the cut profile so as to form a discharging start location for the set of magnetic belts on the discharging side, and the magnetic belts convey the strip steel to the processing station for laser cutting;

b) the profile of the strip steel entering a laser-cutting area of the processing station is measured by the real-time measurement device for positioning, so as to correct coordinates of the origin and the angle of a workpiece coordinate system in the laser-cutting control system before the cutting operation, and when the measurement is complete, the laser-cutting unit cuts the strip steel in a planned path according to a profile to be produced;

during the cutting, the magnetic belts on the feeding side and the discharging side are adjusted synchronously and dynamically according to the cutting path, and the stretching/retraction adjustment amount is determined by the profile to be cut out, wherein the synchronous dynamic adjustment is effected by the cutting control system sending a signal to the control module for the stretching and retraction of the magnetic belts, and during the adjustment, the magnetic belts need to make space for a slit cut during the cutting procedure, so as to prevent the laser from penetrating the strip steel and making contact with any of the magnetic belts; and the magnetic belts on the feeding side and the discharging side at the position corresponding to a cut profile can be stretched or retracted for stabilising and supporting the sheets being processed while fulfilling the needs of material discharging and receiving on the discharging side;

during the cutting procedure, as regards the scraps formed, a signal is generated in the cutting control system and transmitted to the real-time measurement device for detecting and identifying the falling of the scraps in real time; and when the cutting procedure is complete, the cutting control system sends a signal for carrying out a detection of all the cut profiles by the real-time measurement device for the cutting of the strip steel, so as to determine the separation of the processed sheets and the strip steel;

c) when the sheets are processed, the set of magnetic belts on the feeding side is at a feeding end location and the set of magnetic belts on the discharging side is at a discharging end location; the processed sheets enter an outputting state at the discharging end location on the set of magnetic belts on the discharging side and is output to the transfer station, and at the same time, the sets of magnetic belts on the feeding side and the discharging side are stretched or retracted back to the start locations again, strip steel moves onwards by one step for processing in a next cycle; and d) before transferring the sheets, the camera of the sheet position detecting device detects the position of the sheets, the position of the sheets is fed back to the transfer and stacking robot for correcting its posture, and then the tooling at the end of the transfer and stacking robot sticks to and picks up the processed sheets by suction and stacks same at a stacking station.

6. The laser-cutting method according to claim 5, characterized in that, during the cutting procedure, the magnetic belts on the feeding side and the discharging side can be adjusted synchronously and dynamically according to the cutting path, wherein for the cutting path formed by the cutting profile, a corresponding signal for the stretching/retraction operation of the magnetic belts to be adjusted is programmed according to cutting feature information, such that the stretching/retraction of the magnetic belts is adjusted under the control of the cutting system; and each magnetic belt in the sets of magnetic belts can be dynamically adjusted to stretch and retract, and during the adjustment of the magnetic belt, the cutting head carries out the cutting in the cutting path synchronously.

7. The laser-cutting method according to claim 5, characterized in that, two or more laser processing stations are arranged and two or more sets of magnetic belts are arranged for corresponding synchronous sheet transfer units, and each processing station has one or more laser cutters; during the cutting procedure, the sets of magnetic belts on the feeding side and the discharging side corresponding to the cutting head on the laser cutter of each processing station are adjusted synchronously and dynamically, so as to perform regional stepped cutting on a sheet to be processed in two cutting ranges, a part of the sheet to be processed is cut in a first processing station, another part of the sheet to be processed is cut in a second processing station, the laser-cutting heads in the two processing stations operate in coordination with a first set of magnetic belts and a second set of magnetic belts respectively, that is, when the laser-cutting heads of the two processing stations respectively operate in a cutting movement procedure, the two sets of magnetic belts are respectively stretched and retracted synchronously and dynamically, each time one set of operations is complete in the two cutting areas, the strip steel moves onwards by one step, the cutting heads of the two processing stations operate in coordination with the two sets of magnetic belts again, and this cycle is repeated; and the laser-cutting head on the laser cutter of the second processing station makes the final cut and obtains an eventual processed sheet and conveys the processed sheet to a second set of magnetic belts on the discharging side for output.

8. The laser-cutting method according to claim 5, characterized in that, the magnetism of the sets of magnetic belts on the feeding side and the discharging side is activated or deactivated by the control of the electromagnetic module, wherein the electromagnetic module in the laser-cutting area is fully or partially magnetised when the sets of magnetic belts are stationary, and the electromagnetic module is fully demagnetised in the dynamic process of stretching or retraction of the sets of the magnetic belts; and for the cutting path formed by the cutting profile, a magnetic signal for the electromagnetic module for the magnetic belts, which corresponds to magnetic feature information, is programmed so as to achieve the control of the magnetism of the electromagnetic module under the control of the cutting control system.

* * * * *